United States Patent [19]

Livesay

[11] Patent Number: 5,554,666
[45] Date of Patent: Sep. 10, 1996

[54] PHOTOCURABLE COMPOSITIONS

[75] Inventor: Mark Livesay, El Cajon, Calif.

[73] Assignee: Sunrez Corporation, El Cajon, Calif.

[21] Appl. No.: 394,237

[22] Filed: Feb. 24, 1995

[51] Int. Cl.⁶ ........................................................ C08F 2/46
[52] U.S. Cl. ............................................... 522/81; 522/83
[58] Field of Search ........................................ 522/81, 83

[56] References Cited

U.S. PATENT DOCUMENTS

| | | | |
|---|---|---|---|
| 5,158,990 | 10/1992 | Bayer et al. | 522/83 |
| 5,212,271 | 5/1993 | Beckett et al. | 522/8 |
| 5,248,752 | 9/1993 | Argyropoulos et al. | 522/90 |
| 5,306,739 | 4/1994 | Lucey | 522/81 |
| 5,407,972 | 4/1995 | Smith et al. | 522/96 |

*Primary Examiner*—Mark Chapman
*Attorney, Agent, or Firm*—John Lezdey

[57] ABSTRACT

A photocurable putty or molding which is photocurable at a thickness of 20 mm by sunlight. The composition comprises a photocurable resin photoinitiator and as a filler aluminum trihydrate in an amount of about 12 to 70% by weight of composition.

9 Claims, No Drawings

PHOTOCURABLE COMPOSITIONS

FIELD OF THE INVENTION

The present invention relates to photocurable compositions which are useful as fillers, as moldings, and the like. More particularly, there is provided a photocurable putty or molding composition and a means to thicken the composition without affecting its photocurability.

BACKGROUND OF THE INVENTION

Light cured or photocured resins are well known and are particularly used in the preparation of surface coatings and in the preparation of fiber reinforced composites such as prepregs.

Light cured or photocured putties have found a use in moldings for windows, canopy repair and vehicle repair. However, their applications and use have been limited when they have been applied in thick sections, as a body or filler putty or for general repair. They must be thickened in orders for them to adhere and cure and not run or slough off. Usually the thickening agents are low cost materials such as calcium carbonate or natural mineral. However, such thickeners block or absorb the wavelengths of light necessary for effective curing. When a putty or molding is to have a thickness of at least 20 mm, the thickening agent must be translucent or transparent to visible/UV light and also possess properties which do not interfere with the general characteristics of the mold or putty. The thickener must be such that it does not separate out, and that when the resin is cured, that the cured resin containing the thickener must be light transparent or translucent in the resin system to wavelengths between 350 and 420 mm, be finely divided and have interaction with the uncured resins so that it does not separate out.

SUMMARY OF THE INVENTION

The invention provides a molding or putty composition which can be effectively photocured at a thickness of at least 20 mm. The compositions of the invention comprise a photocurable resin, an ethylenically unsaturated monomer, aluminum trihydrate or anatase as the primary thickener and a photoinitiator.

Advantageously, the composition comprises an unsaturated polyester resin admixed with 20 to 40% by weight of styrene, about 12 to 70% by weight of composition of aluminum trihydrate and about 0.1 to about 0.9% by weight of a photoinitiator.

It is therefore an object of the invention to provide a putty or molding composition which can be photocured at thicknesses of 20 mm or more.

It is further object of the invention to provide a method for thickening a photocurable composition without interfering with the cure rate.

It is yet another object of the invention to provide a putty composition which is curable by sunlight.

DESCRIPTION OF THE PREFERRED EMBODIMENTS

The putty compositions of the invention contain as a primary thickening agent aluminum trihydrate in an amount of about 12 to 70% by weight of composition. The composition comprises a photocurable resin which is preferably a polyester, about 20 to 40% by weight of an unsaturated monomer which is preferably a styrenic monomer such as styrene, and about 0.1 to 0.9% by weight of a photoinitiator.

The composition may also contain a cocatalyst, for example, benzoyl peroxide.

The resin system of the invention must be unpromoted and contain no cobalt or other transition metal salts.

Other thickeners can be added so long as they do not interfere with photocuring. Up to 15% by weight of light transparent silica sand and/or powdered glass or milled glass fiber may be added. About 3 to 10% by weight of fumed silica may be used. Minor amounts of magnesium oxide or hydroxide may be added depending upon the thickness of the putty or molding.

The invention is not limited to any particular genus of resin. Resins include epoxy, olefinically unsaturated polyesters, vinyl esters and an olefinically unsaturated monomer copolymerizable therewith. The viscosities of resins range from about 100 cps to about 1000 cps over a temperature range between 200 degrees to 340 degrees F.

The polyester resins used in the invention can be prepared in any convenient manner and is generally composed of one or more aliphatic and/or cycloaliphatic, mono-, di and/or polyvalent alcohols and one or more monovalent carboxylic acids and/or esters thereof. As examples of suitable alcohols may be alcohols and one or more monovalent carboxylic acids and/or esters thereof. As examples of suitable alcohols may be mentioned benzyl alcohol, ethylene glycol, propylene glycol, neopentyl glycol, hexanediol, dimethylol cyclohexane 2,2-bis-(4-hydroxycyclohexyl) propane, 2,2-bis-(p-phenyleneoxyethanol)-propane, 2,2-bis-(p-phenyleneoxypropanol-2)-propane, diethylene glycol, glycerol, trimethylol ethane, trimethylol ethane, trimethylol propane, pentaerythritol and/or dipentaerythritol. Instead of, or besides the alcohol compound(s) one or more epoxy compounds may be used, for instance ethylene oxide, propylene oxide, epoxy propanol and isodecanoic glycidyl ester. As examples of suitable di- or polyvalent carboxylic acids may be mentioned maleic acid, fumaric acid, itaconic acid, citraconic acid, malonic acid, succinic acid, glutaric acid, adipic acid, azelaic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid also may be used in the form of an anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids and polyvalent alcohols such as glycerol. As examples of suitable monocarboxylic acids may be mentioned fatty acid precondensates having 5 to 10 carbon atoms, heptanoic acid, pelargonic acids, isononanoic acid, lauric acid, stearic acid, oleic acid, linoleic acid, linolenic acid, cerotic acid, benzoic acid, tert-butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with, for instance, an organic solvent such as toluene or xylene, after which generally the volatile constituents are to the desired extent removed in vacuo.

As ethylenically unsaturated monomer any usual monomer may be employed. As examples of suitable monomers may be mentioned styrene, α-methyl styrene, vinyl toluene, divinyl benzene, diallyl phthalate and acrylic or methacrylic (hydroxy) esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 20 to 40% by weight, based on the polyester composition.

In the present invention, the resin and catalyst may be mixed just prior to use or they may be introduced separately relying on the dynamics of the system to mix these components sufficiently. The mixture may be warmed to 120° F. of to blend in the thickening agents. In the preferred photocuring process the catalyst can comprise any conventional photoinitiators and/or photosensitizers. The preferred photoinitiators are isobutyl benzoin ether and α, α-diethoxyacetophenone. Mixtures of photoinitiators may be used. The preferred photosensitizers are the acylphosphine oxides as disclosed in U.S. Pat. No. 4,265,723, which is herein incorporated by reference, and the photosensitizers which have a triplet energy in the range of about 54 to 72 kilocalories per mole as disclosed U.S. Pat. No. 4,017,652, which is herewith incorporated by reference.

Ultraviolet radiation may be used most efficiently if the photocurable composition contains a suitable photoinitiator, e.g. bisphenyl (2,5-dimethybenzoyl) phosphine oxide (Palatal).

Suitable photoinitiators are the acylphosphine oxides which are disclosed in U.S. Pat. No. 4,265,723 and consist of compounds of the formula:

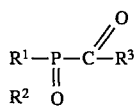

where $R^1$ is straight-chain or branched alkyl of 1 to 6 carbon atoms cyclohexyl, cyclopentyl, aryl which is unsubstituted or substituted by halogen, alkyl or alkoxy, or a S-containing or N-containing five-membered or six-membered heterocyclic radical, $R^2$ has one of the meanings of $R^1$ (but $R^1$ and $R^2$ may be identical or different) or is an alkoxy of 2 to 6 carbon atoms, aryloxy or araloxy, or $R^1$ and $R^2$ together form a ring, and $R^3$ is straight-chain or branched alkyl of 2 to 18 carbon atoms, a cycloaliphatic radical of 2 to 10 carbon atoms, phenyl, naphthyl or a S, O, or N containing five-membered or six membered heterocyclic radical and may contain additional substituents, or is the group where $R^1$ and $R^2$ have the above meanings and X is phenylene or aliphatic or cycloalipatic divalent radical of 2 to 6 carbon atoms, and one or more of the radicals $R^1$ to $R^3$ may be olefinically unsaturated.

The aliphatic and aromatic phosphates which may be utilized are disclosed in the U.S. Pat. No. 4,116, 788. Examples for the phosphites to be used as activators according to the invention are listed as follows: dimethylphosphite, dioctyl-phosphite, diphenylphosphite, tri(i-octyl) phosphite, tristearyl phosphite, trimethylphosphite, triethyl-phosphite, tri (i-propyl)phosphate, tris(allyl)phosphite, didecyl-phenylphosphite, tris(4-nonphenyl)phosphite, and tris-4 chlorophenyl-phosphite.

The photosensitizers which have a triplet energy in the range from about 54 to 72 kilocalories per mole which may be utilized are disclosed in U.S. Pat. No. 4,017,652 and include benzil, 3,4-benzofluorene, 4-naphthaldehyde, 1-acetylnaphthalene, 2,3-butanedione, 1-benzoylnaphthalene, 9-acetylphenanthrene, 3-acetylphenanthrene, 2-napthaldehyde, 2-benzoylnaphthalene, 4-phenylacetophenone, anthraquinone, thioxanthone, 3,4-methylenedioxyacetophenone, 4-cyanobenzophenone, 4-benzoylpyridine, 2-benzoylpridine, 4,4-dichlorobenzophenone, 4-trifluoromethylbenzophenone, 3-chlorobenzophenone, 4-methoxybenzophenone, 3,4-dimethylbenzophenone, 4-methylbenzophenone, benzophenone, 2-methylbenzophenone, 4-4'-dimethylphenone, 2,5-dimethylbenzophenone, and 2,4-dimethylbenzophenone. Many of the photoinitiators which may be used in the present invention fall within the formula.

Any suitable source that emits ultraviolet light, viz., electromagnetic radiation having a wave length in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirling flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2037, 60-0197, 60-0393, and 60-2081 and Hanovia Models 6512A431, 6542A431, and 6477A431.

The time of exposure to ultraviolet light and the intensity of the ultraviolet light to which the composition is exposed may vary greatly. Generally the exposure to ultraviolet light should continue until the polymerization is complete.

The invention is furthers illustrated by the following Example:

EXAMPLE 1

A putty composition was prepared by adding 0.7 g of Palatal photoinitiator to 100 g of commercial unsaturated phthalic polyester resin containing 40% styrene while protecting from direct sunlight. Then 30 g of aluminum trihydrate was added with stirring and 8 g of milled fiberglass was added with stirring a 20 mm thick composition cured in 10 minutes in sunlight.

Optionally, the mixture may be heated to speed up the process of adding the thickening agents.

The technique described herein are capable of some variations without departing the spirit and scope of this invention as will be apparent to those of skill in this art.

What is claimed is:

1. In a photocurable putty or molding composition containing a photocurable resin, a photoinitiator, an ethylenically unsaturated monomer and a thickening agent, and glass filler the improvement which comprises said thickening agent comprising about 12 to 70% by weight of aluminum trihydrate.

2. The composition of claim 1 wherein said photocurable resin is a polyester.

3. The composition of claim 1 wherein said ethylenically unsaturated monomer is styrene.

4. The composition of claim 1 including a cocatalyst.

5. A photocurable putty or molding composition which is photocurable at a thickness of 20 mm which comprises:

a) an unsaturated polyester resin;

b) about 20 to 40% by weight of polyester resin of a styrenic monomer;

c) about 12 to 70% by weight of composition of aluminum trihydrate;

d) about 0.1 to 0.9% by weight of composition of a photoinitiator;

e) milled fiber glass.

6. The composition of claim 5 wherein said styrenic monomer is styrene.

7. The composition of claim 5 wherein said photocurable polyester is an unsaturated phthalic polyester resin.

8. The composition of claim 5 including a cocatalyst.

9. The composition of claim 5 which is free of transition metal salts.

* * * * *